United States Patent [19]
Wittler

[11] Patent Number: 5,313,751
[45] Date of Patent: * May 24, 1994

[54] INTERLOCKING STRUCTURAL MEMBERS WITH EDGE CONNECTORS

[76] Inventor: Waldemar E. Wittler, 25 Harbourside Rd., North Quincy, Mass. 02171

[*] Notice: The portion of the term of this patent subsequent to Mar. 24, 2009 has been disclaimed.

[21] Appl. No.: 7,355

[22] Filed: Jan. 19, 1993

Related U.S. Application Data

[63] Continuation of Ser. No. 695,592, May 3, 1991, abandoned, which is a continuation-in-part of Ser. No. 630,067, Dec. 19, 1990, Pat. No. 5,097,643.

[51] Int. Cl.⁵ .................. E04H 3/00; E04C 2/10; A47G 5/00
[52] U.S. Cl. .................. 52/238.1; 52/588; 52/281; 160/135
[58] Field of Search .......... 52/238.1, 239, 588, 52/595, 581, 586, 280, 281, 282, 285, 578, 579; 160/135, 351

[56] References Cited

U.S. PATENT DOCUMENTS

| | | | |
|---|---|---|---|
| 2,228,363 | 1/1941 | Pinney | 189/34 |
| 2,414,060 | 1/1947 | Rausch | 20/4 |
| 2,948,364 | 8/1960 | Cooper | 189/34 |
| 3,009,549 | 11/1961 | Miller | 189/34 |
| 3,397,496 | 8/1968 | Sohns | 52/286 |
| 3,509,673 | 5/1970 | Witkosky et al. | 52/242 |
| 3,608,260 | 9/1971 | Eckel et al. | 52/284 |
| 3,695,330 | 10/1972 | Hasbrouck | 160/135 |
| 3,859,000 | 1/1975 | Webster | 404/41 |
| 3,974,616 | 8/1976 | Beckley | 52/738 |
| 4,128,983 | 12/1978 | Matsubara | 52/731 |
| 4,186,539 | 2/1980 | Harmon et al. | 52/580 |
| 4,344,475 | 8/1982 | Frey | 160/135 |
| 4,438,605 | 3/1984 | DeLucia | 52/71 |
| 4,744,185 | 5/1988 | Lamberet et al. | 52/309 |
| 4,765,107 | 8/1988 | Ting | 52/235 |
| 4,828,005 | 3/1989 | Notley | 160/351 |
| 4,905,428 | 3/1990 | Sykes | 52/126 |

FOREIGN PATENT DOCUMENTS

| | | |
|---|---|---|
| 1249410 | 1/1989 | Canada .................. 20/33.4 |
| 2802151 | 7/1979 | Fed. Rep. of Germany . |
| 1532671 | 7/1968 | France . |
| 542966 | 11/1973 | Switzerland . |
| 1445687 | 8/1973 | United Kingdom . |
| 2093085 | 8/1982 | United Kingdom . |

Primary Examiner—Carl D. Friedman
Assistant Examiner—Kien Nguyen
Attorney, Agent, or Firm—Fish & Richardson

[57] ABSTRACT

An edge connector for connecting structural members at their adjacent edges is disclosed, including a base extending transversely between its edges, a support wall integral with the base and extending away from the base on one side thereof, the support wall extending generally parallel to the base edges and being positioned between the transverse center of the base and one edge; and a tongue integrally connected at one end to the support wall, extending from the support wall to a free end thereof; and spaced away from the base and positioned between the transverse center of the base and the other edge of the base on the side of the center opposite the one base edge, the tongue and the base defining a recess therebetween to receive the tongue of a mating connector.

32 Claims, 8 Drawing Sheets

INTERLOCKING STRUCTURAL MEMBERS WITH EDGE CONNECTORS

This is a continuation of application Ser. No. 07/695,592, filed May 3, 1991, now abandoned, which was a continuation-in-part of application Ser. No. 07/630,067, filed Dec. 19, 1990, now U.S. Pat. No. 5,097,643, issued Mar. 24, 1992.

BACKGROUND OF THE INVENTION

This invention relates to interlocking structural members, (e.g., display panels) connected together at their edges.

Portable interlocking structural members such as display panels and room dividers, are frequently held together in the desired arrangement by connectors located along the edge of the panels. It is known to provide connectors consisting of bead and groove conformations in mating interfitting tongue and socket structures, oriented in the plane of the panels. The tongue and socket structures are interconnected by longitudinal movement of the adjacent panels towards each other.

SUMMARY OF THE INVENTION

In one aspect the invention features an edge connector for connecting panel members at their adjacent edges, including a base extending transversely between edges of the base; a support wall integral with the base extending away from the base on one side thereof, the support wall extending generally parallel to the base edges and positioned between the transverse center of the base and one edge of the base; a tongue integrally connected at one end to the support wall and extending from the support wall to a free end thereof spaced away from the base and positioned between the support wall and the other edge of the base, the tongue and the base defining a recess therebetween to receive the tongue of a mating connector; and at least one detent or groove on a surface of the connector on the one side thereof to receive a bead or protrusion on a surface of a mating connector. Preferred embodiments include the following features. The edge connector comprises an elongated extrusion, and the base edges, support wall and tongue extend along the length of the extrusion. The base includes at least one leg integral with and extending away from the base on the other side opposite the support wall. Alternatively, the base includes two such legs and a crossbar spaced from the base and creating a groove between the legs, the base and the crossbar; the legs preferably extend away from the base beyond the crossbar. The tongue, in section, has parallel walls extending parallel to the base and is spaced from the base a sufficient distance to receive a similarly dimensioned tongue of a mating connector. The end of the support wall and the side of the tongue opposite the recess define a continuous outer surface that includes a protrusion or bead extending from the outer surface away from the recess between the transverse center of the base and the edge of the base near which the support wall is located. Preferably, the protrusion is located on the end of the support wall. The base includes a detent or groove located between the transverse center of the base and the other edge, and preferably between the free end of the tongue and the other edge of the base, and adapted to receive a protrusion on the support wall of a mating connector.

In one embodiment, the base may further include a bracing wall integral with the base and extending from the base between the support wall and one edge of the base, generally parallel with the support wall. Preferably, the bracing wall also includes a protrusion or bead extending from the end of the bracing wall away from the base; and the base also includes a second detent or groove parallel to the bracing wall, positioned adjacent and beyond the free end of the tongue, and adapted to receive a protrusion on the bracing wall of a mating connector.

In another aspect the invention features a plurality of edge connectors integrally connected at the edges of their bases and angularly disposed relative to each other.

In another aspect the invention features a structural member and connector assembly including a structural member and a connector as described, the connector being attached to one side edge of the structural member, the structural member having at least one groove in its side edge receiving therein the leg integral with the connector and extending away from the connector base on the side opposite the support wall.

Edge connector strips for interlocking structural members that have a tongue oriented parallel to the base of the connector, so that the oppositely oriented tongue of an opposed connector is interlocked between the tongue and the base of the strip, form an easily assembled and disassembled and yet secure connection between adjacent units in a structural member assembly. The orientation of the connector strips on the edge of the structural members with the tongues of the connectors parallel to the structural member edges means that assembly and disassembly of the structural members requires very little maneuvering room.

DESCRIPTION OF THE PREFERRED EMBODIMENTS

A lightweight, sturdy, adaptable display panel system that is easily assembled and disassembled is made of edge protected, plastic laminate clad styrofoam panels held together in the desired angular arrangement by extruded plastic connectors secured to the edges of the panels. The panel system is assembled by snapping together or engaging the appropriate connectors in a lateral movement past each other, in a plane perpendicular to the plane of an adjacent panel. To disassemble the panels, the connectors are unlocked by deflection out of the local plane of the assembled system.

Figure 1:
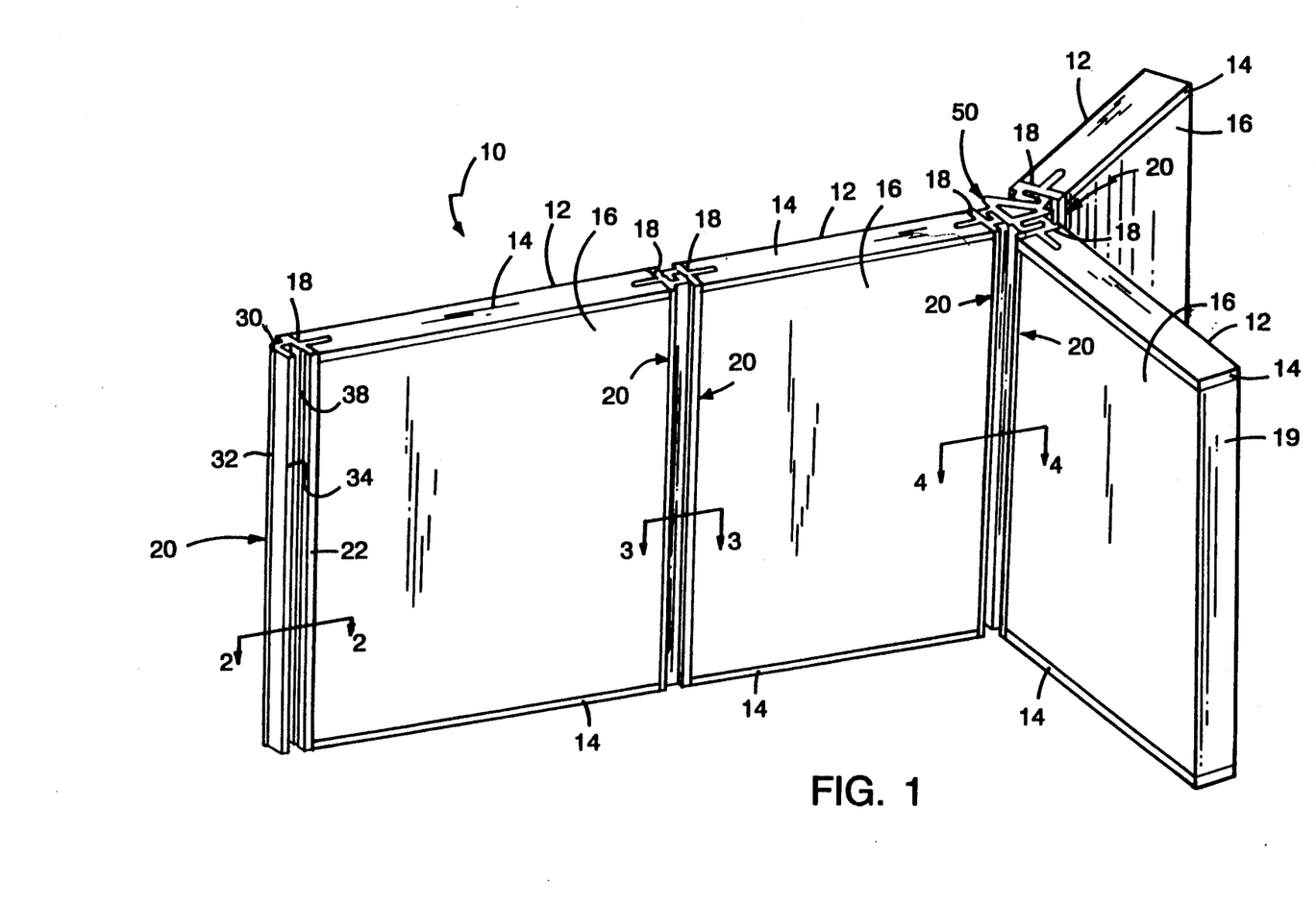
FIG. 1 is a perspective view of a panel system according to the invention.

Referring to FIG. 1, a system of structural members 10 comprises individual insulating foam panels (Branch River, Smithfield, R.I.) 12, typically 8.0' high $\times$ 4' wide $\times$ 1.5" thick, each having a two pound density expanded styrene styrofoam core, a 0.75" thick protective wood strip 14 top and bottom, and sides 16 laminated with a protective coating of 0.031" paper backed plastic laminate (not shown), the wood strip and the plastic laminate being attached to the foam core with a water-based resin (is set resin WD3-A322 and hardner CX47, manufactured by Ashland Chemical Co., Columbus, Ohio. At each vertical edge 18 of a panel 12, except for finish end edge 19, is an elongated, high-impact extruded styrene plastic edge connector strip 20, extending substantially the length of the panel edge 18.

Figure 2:
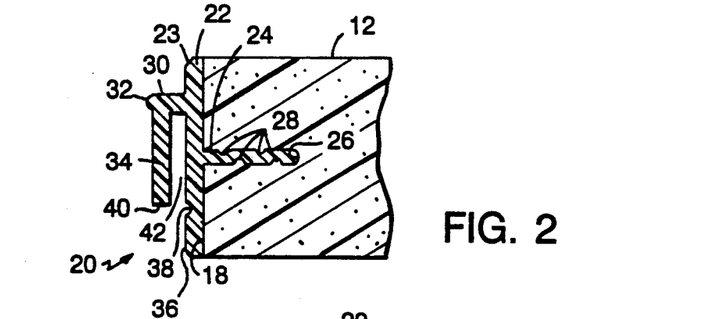
FIG. 2 is a sectional view taken at line 2—2 of FIG. 1.

Referring to FIG. 2, elongated edge connector 20 has a 1.5" wide transverse base 22 extending the full width of a panel edge 18. The corners 23 of the base are chamfered at 45°. Base 22 has an integrally connected central leg 24 extending into a groove 26 in the center of the panel and generally forming a T with the base. Leg 24 contains a plurality of striations or notches 28 for holding an assembly glue compatible with the styrofoam core (e.g., a two part solvent less epoxy resin, West System 105 Epoxy Resin, Group B, and Fast Epoxy Hardner 205 or Slow Epoxy Hardner 206, all manufactured by Gougeon Brothers, Inc., Bay City, Mich.). Beads of the glue are applied in the groove 26 and on the panel edges on each side of the groove 26 to securely bind the connector 20 to the panel 12. On the other side of the T an integrally connected short leg or support wall 30 (0.25" long), having a 0.031" high integrally connected protrusion or bead 32 on its end, is positioned between the transverse center of base 22 and one end of the base and extends away from panel end 18. Just below bead 32, a 0.125° thick integrally connected tongue 34 extends 0.75" from support wall 30 parallel to base 22, a short distance beyond the transverse center of the base, so that the tongue is centered on the base, to form recess 42 between the tongue and the base. In the surface 36 of base 22 facing towards tongue 34, and just outside the projection of free end 40 of tongue 34 onto base surface 36, i.e., at a distance from the center of the tongue and, in the illustrated embodiment, from the center of the base equal to the distance of the bead from the centers, a 0.031" deep recessed detent or groove 38 is provided to receive the bead on the support wall of another connector.

Figure 3A:
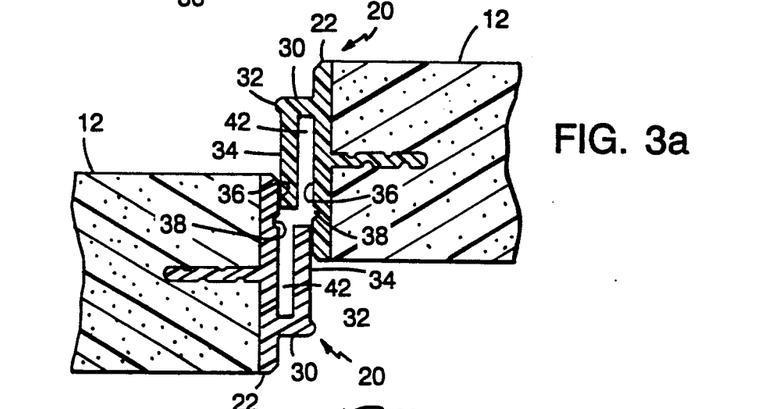
FIG. 3a is a sectional view taken at line 3—3 of FIG. 1 prior to the assembly of two adjacent panels.
Figure 3B:
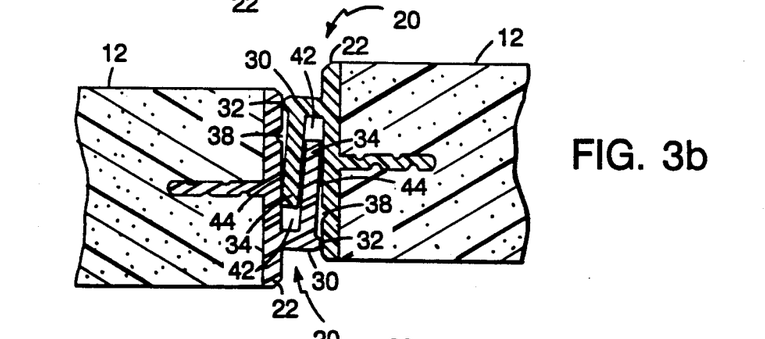
FIG. 3b is a sectional view taken at line 3—3 of FIG. 1 during the assembly of two adjacent panels.
Figure 3C:
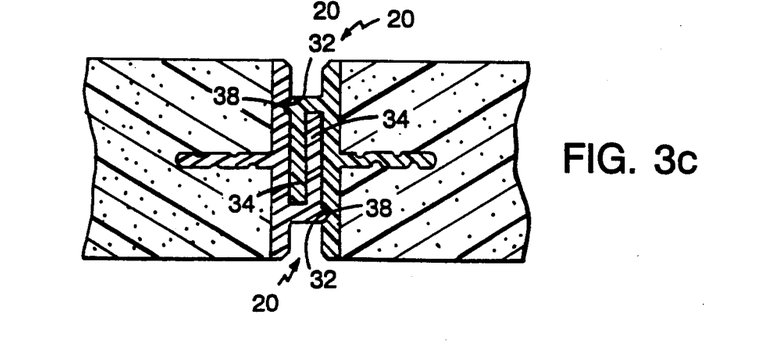
FIG. 3c is a sectional view taken at line 3—3 of FIG. 1 after assembly of two adjacent panels.

When a number of panels 12 are assembled into a system, linearly extending panels are held together by interlocking the identical opposing connector strips 20 on the edges of adjacent panels 12. Referring to FIG. 3a, to connect two panels, each connector tongue 34 is positioned opposite the entrance to recess 42 on the opposing connector. Referring to FIG. 3b, as each tongue 34 is moved laterally along the surface 36 of the opposing connector base, bead 32 is pushed onto surface 36 of base 22, thus forcing the outer surface 44 of each tongue 34 away from contact with surface 36 of the opposing base and deflecting each tongue 34 out of a plane parallel to the bases of the two connector strips 20. Finally, referring to FIG. 3c, as each tongue 34 is moved further into recess 42 of the opposing connector strip, each bead 32 reaches and snaps into groove 38 in the base of the opposing connector, locking the connectors and adjacent panels together.

Figure 4:
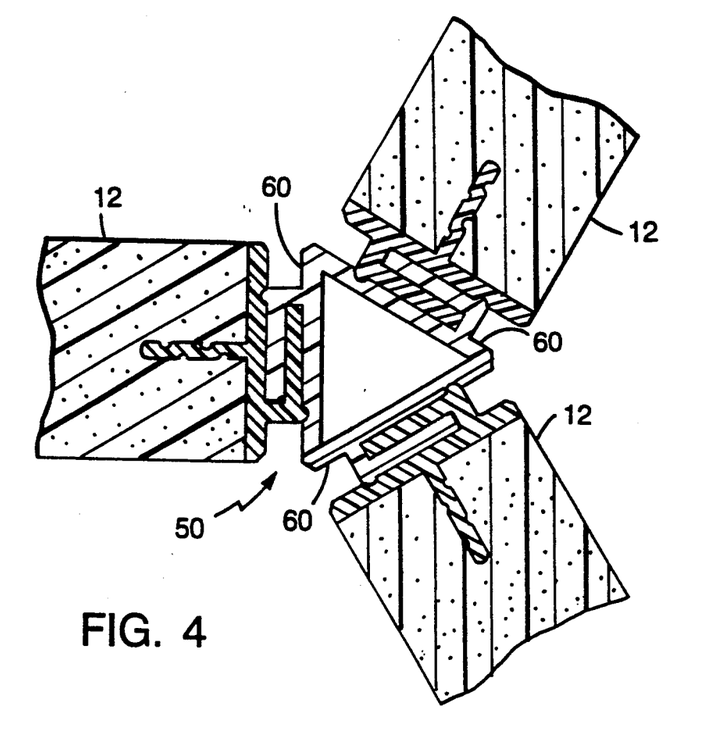
FIG. 4 is a sectional view taken at line 4—4 of FIG. 1.

Referring again to FIG. 1, numerous angular arrangements of various panels 12 are possible. For example, it may be desirable to connect three panels together in the form of a Y. For this application, a special connector post is used. Referring to FIG. 4, connector post 50 consists of three connectors 60, identical in dimension to connector 20 but lacking central leg 24. The individual connectors 60 are integrally connected at the edges of their bases to form an equilateral triangle. Connector post 50 is joined in sequence to three individual panels 12, using the same procedure as described before, to form the Y arrangement.

Figure 5:
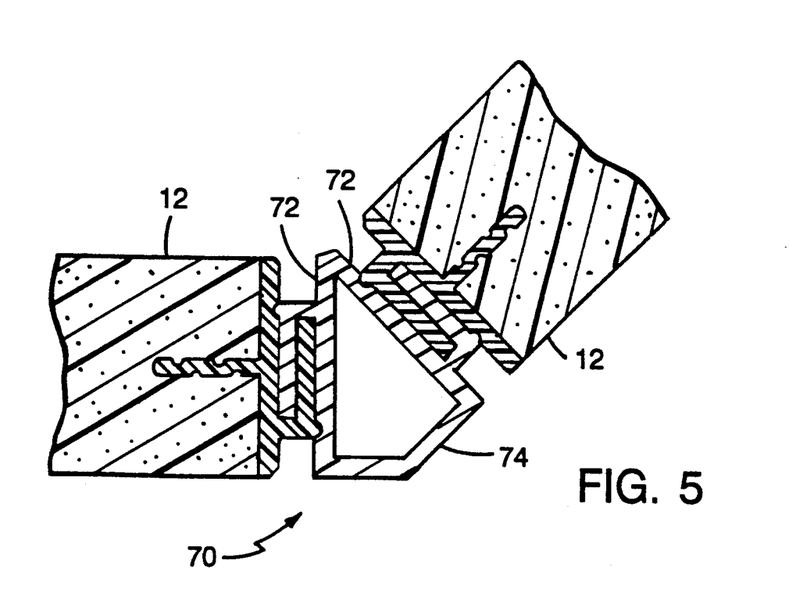
FIG. 5 is a sectional view of a panel system with panels arranged at 45° to one another.

In a similar manner, using appropriately designed connector posts, other panel arrangements can be formed. For example, referring to FIG. 5, a post 70, having two connectors 72 held apart at a 45° angle by a spacer 74, is used to join two panels 12 at an angle of 45°. Other angular connectors, e.g. 90° connectors, can likewise be employed.

Figure 6:
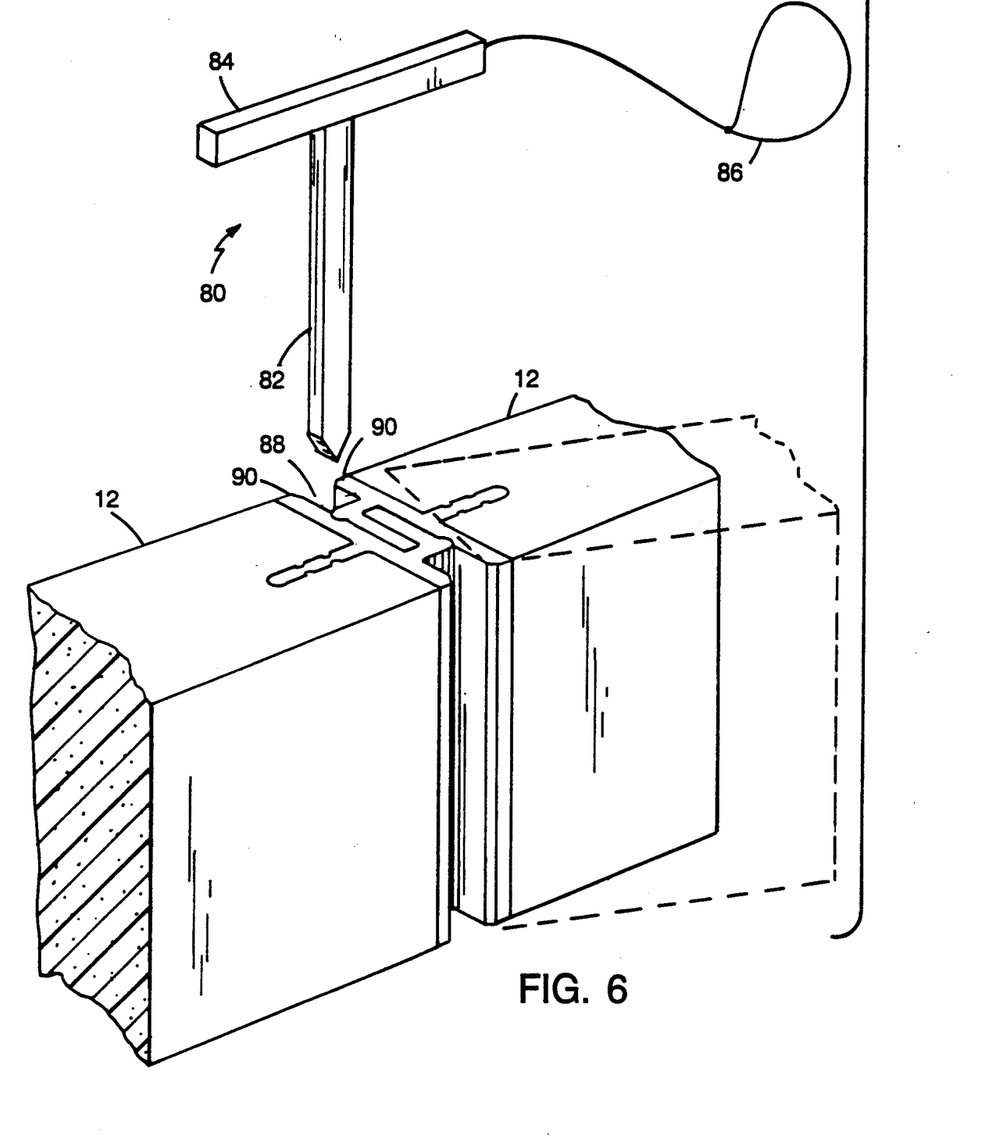
FIG. 6 is a perspective view of a panel system being disassembled and a tool used to aid disassembly.

As two individual connector strips interlock very securely, a specially designed releasing tool is used to disassemble panels so attached. Referring to FIG. 6, to release two attached connectors, tool 80, having a 0.281" wide shaft 82 tapered at its end, a handle 84, and a wrist strap 86, is inserted into the 0.25° wide space 88 between adjacent panels adjacent the interlocking connectors. As tool 80 is forced into space 88 parallel to the support wall of the adjacent connector, the ends 90 of the connectors are pushed apart to remove the adjacent bead from the groove of the connector. The panels 12 are then deflected out of the plane of alignment, as shown by the dotted line, and can be further disengaged manually.

Figure 7:
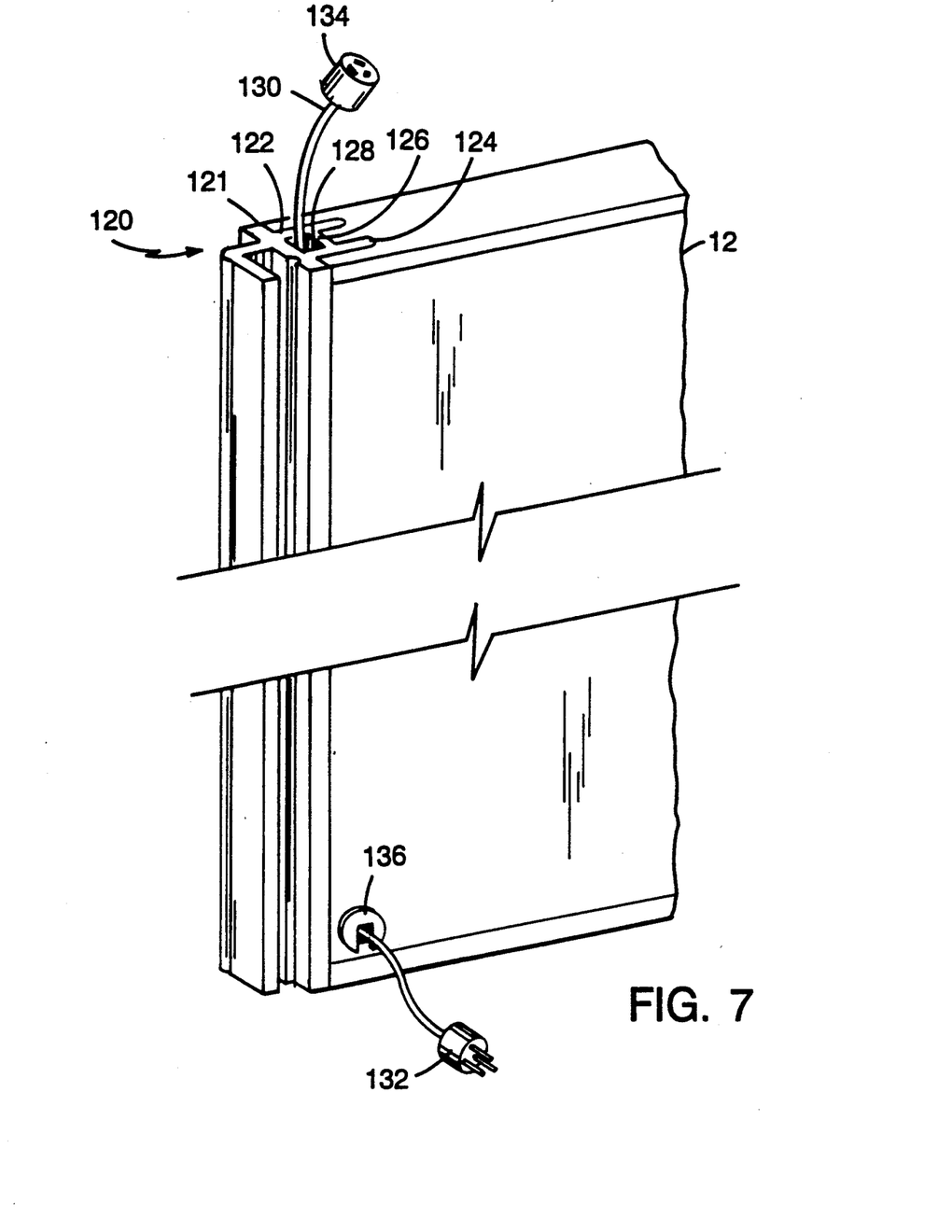
FIG. 7 is a partial perspective view of an alternate embodiment of a panel system according to the invention.

Referring to FIG. 7, a specially adapted connector strip 120, providing a conduit for supplying electricity on a panel for lights and other uses, has two legs 122, 124 extending into a panel 12. A crossbar 126, between legs 122, 124 and spaced from base 121, forms a hollow groove 128 running the length of the connector strip. An electrical cord 130, having a plug end 132 and a socket end 134, is inserted into groove 128 through a hole in panel 12 and the wall of the groove and exits the panel near its base through a grommet 136.

Figure 8:
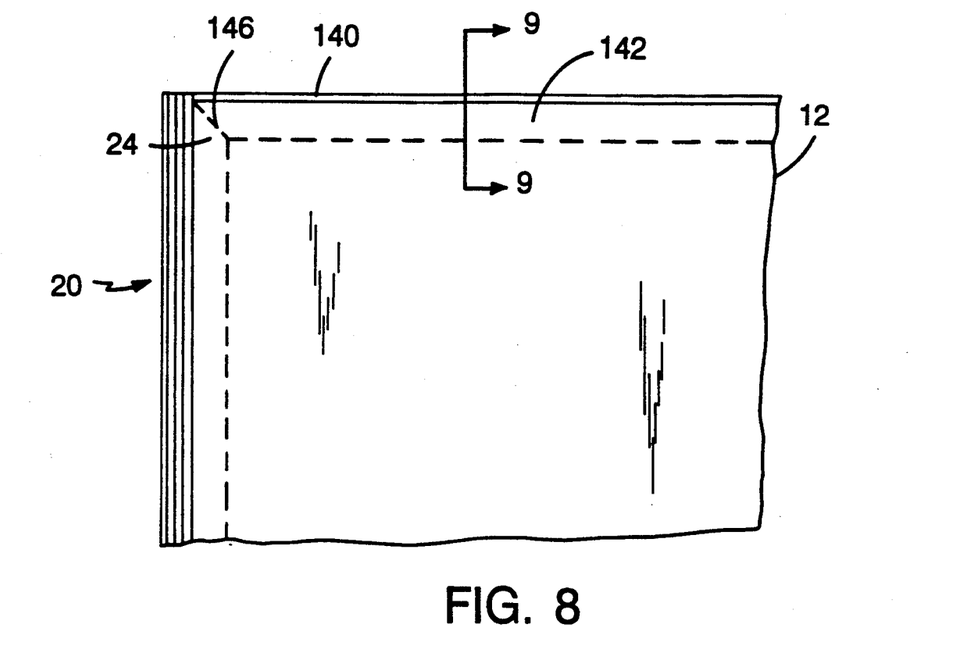
FIG. 8 is a partial side view of an alternate embodiment of a panel system according to the invention.
Figure 9:
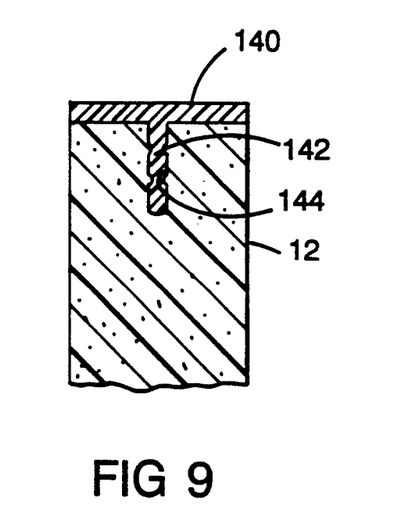
FIG. 9 is a sectional view taken at line 9—9 of FIG. 8.

Referring to FIGS. 8 and 9, in an alternative construction of a panel 12, a 0.031' thick styrene plastic cap 140, having a central leg 142 inserted in groove 144 in the top edge of the panel, provides top protection for the panel in place of a wooden strip. As indicated by the dotted lines in FIG. 8, recessed central leg 142 of the plastic cap 140 abuts the recessed leg 24 of edge connector 20 in a mitered joint 146. The cap 140 is secured to the panel by the same two part solvent less epoxy resin as is utilized to secure the edge connector 20 to the panel 12. A similar cap may be used along the base of the panel.

Figure 10:
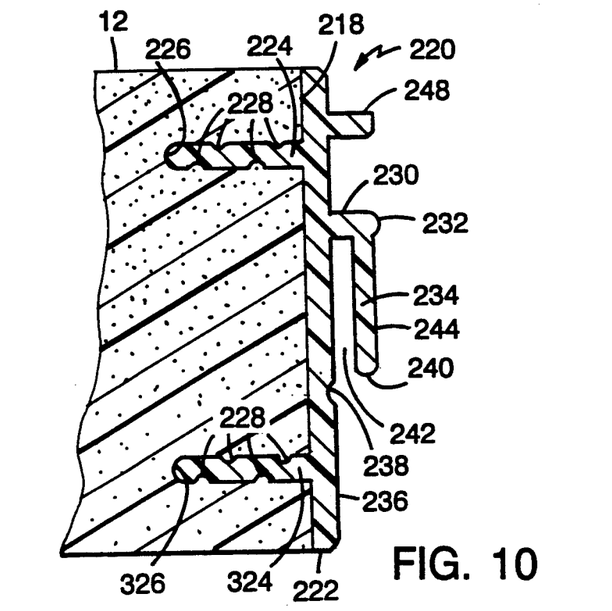
FIG. 10 is a sectional view of an alternate embodiment of a panel system according to the invention.
Figure 11:
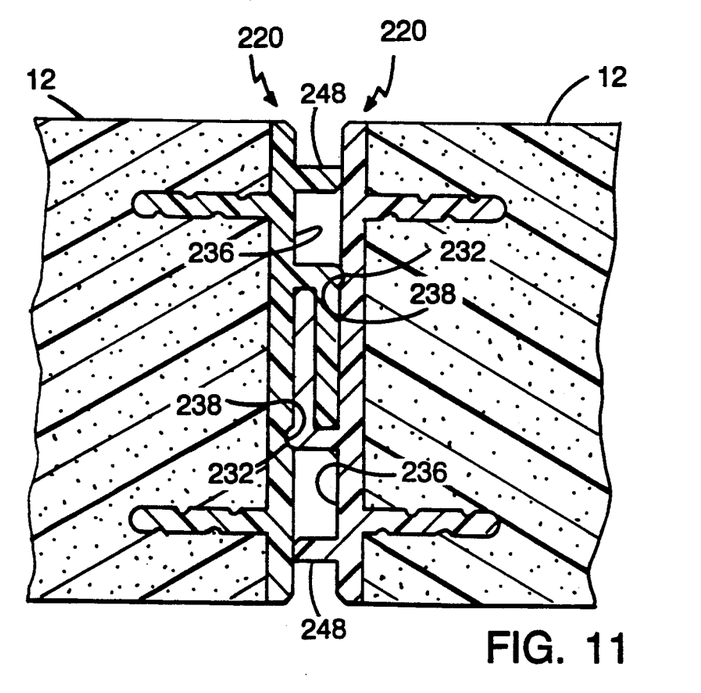
FIG. 11 is a sectional view of an alternate embodiment of a panel system according to the invention.

In another embodiment, an edge connector is adapted for use with a wider panel. Referring to FIGS. 10–11, connector 220, extending substantially the length of panel edge 218, has a 2.5" wide transverse base 222, with two integrally connected legs 224, 324 extending into panel grooves 226, 326. On the other side of the base from legs 224, 324, in a configuration similar to connector 20 (as shown in FIG. 2), support wall 230 (0.25" long), extending away from panel edge 218, is positioned between the transverse center of base 222 and one end of the base, with a 0.75" long integrally connected tongue 234 extending parallel to and centered on the base. At the end of support wall 230 is situated integrally connected bead 232, and in the surface 236 of base 222, facing towards tongue 234, is provided a recessed groove 238, positioned at a distance from the center of the tongue and, in the illustrated embodiment, from the center of the base equal to the distance of the bead 232 from the centers to receive a bead 232 on the support wall of an opposing connector. Connector 220 also contains an additional wall or bracing leg 248 (0.25" long) integrally connected to and extending from base 222 and positioned between support wall 230 and the closer end of the base, 0.25" from the base end. In the embodiment illustrated in FIGS. 10 and 11, the height of bracing leg 248 is equal to the distance between base 222 and the outer surface 244 of tongue 234.

Referring to FIG. 11, when two connectors 220 are engaged, so that each tongue 234 is seated in recess 242 of the opposing connector strip and each bead 232 is snapped into groove 238 in the base of the opposing connector, each bracing leg 248 comes to rest against the surface 236 of the opposing connector base to provide additional stability to the 2.5" wide panel system.

Figure 12:
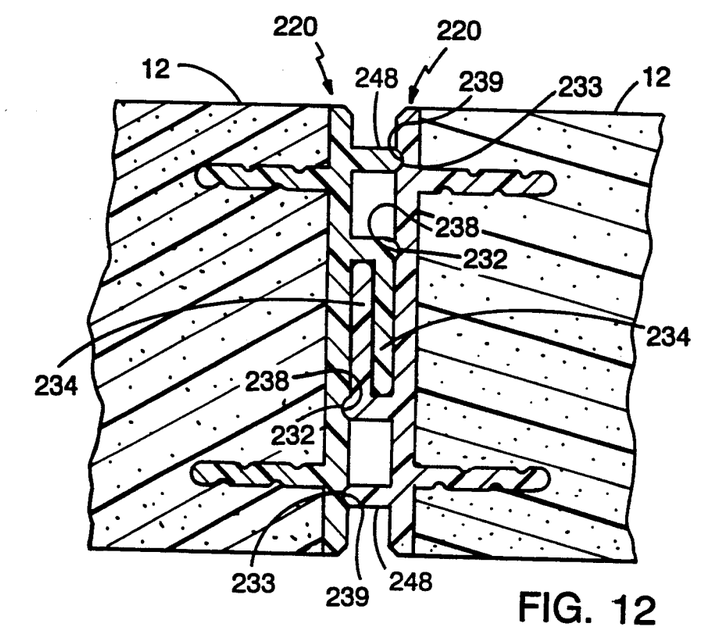
FIG. 12 is a sectional view of an alternate embodiment of a panel system according to the invention.
Figure 13:
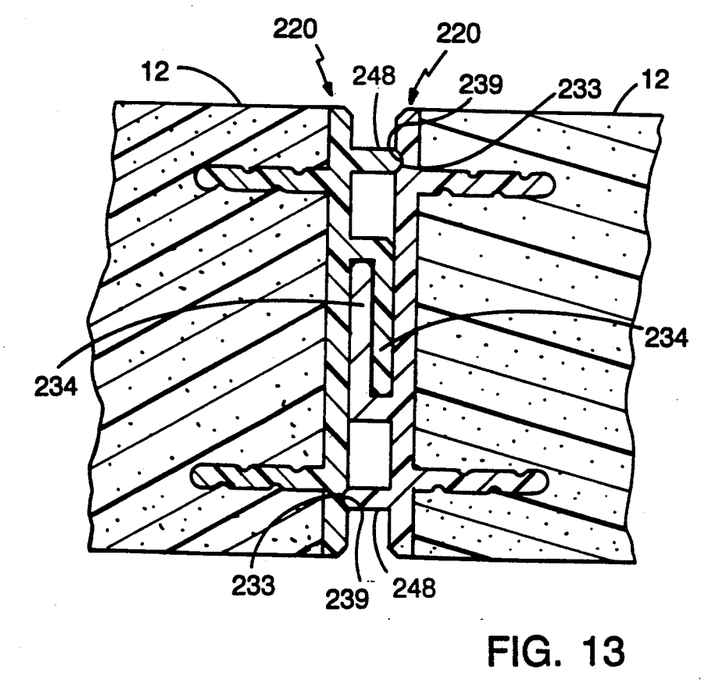
FIG. 13 is a sectional view of an alternate embodiment of a panel system according to the invention.

Referring to FIG. 12, in an alternate configuration, bracing leg 248 also has at its end a 0.031" integrally connected bead 233; and a groove 239 (0.031" deep) is provided in base surface 236, 0.25" from the other base end (on the other side of the transverse center of the base from bracing leg 248) to receive a bead 233 at the end of a bracing leg of an opposing connector 220. Groove 239 is positioned at a distance from the center of the base 222 and, in the illustrated embodiment, from the center of the tongue 234, equal to the distance of bracing leg 248 therefrom. In this configuration, two locking elements are provided for every connection. In yet another embodiment, illustrated in FIG. 13, the two tongues 234 on opposing connectors 220 may be friction fit, with the beaded bracing legs 248 (engaging grooves 239 on opposing connectors) providing the sole locking element.

Use

The panels can be assembled in any desired arrangement, e.g., as room dividers or as a backdrop for a display at a trade show. They are lightweight, one 8' panel weighing only about 27 pounds, and yet the system is sturdy, with the connector strips holding the panels securely together.

Other embodiments are within the following claims. For example, the panels can be of a variety of sizes, can be made of any other kind of convenient material, such as wood or corrogated cardboard, and can be finished with any kind of surface material, e.g., cloth. The connector strips can also be made of resilient metal and can be interlocked by friction fit rather than by a bead and groove arrangement as described. Extrusion lengths can be varied as desired for panels of different heights. With stronger panel material and the appropriately oriented connector, the panel system can be used to form support systems or containers.

What is claimed is:

1. An edge connector for connecting panel members at their adjacent edges, comprising:
    a base extending transversely between edges of said base;
    a support wall integral with said base extending away from said base on one side thereof, said support wall extending generally parallel to said base edges and being positioned between the transverse center of said base and one edge of said base;
    a tongue integrally connected at one end to said support wall and extending from said support wall to a free end thereof spaced away from said base and positioned between said support wall and the other edge of said base, said tongue and said base defining a recess therebetween to receive a tongue of a mating connector,
    at least one protrusion or bead integral with and extending away from an outwardly facing surface of said connector on said one side of said base to engage a detent or groove n a surface of a mating connector, sand
    at least on detent or groove in an outwardly facing surface of said connector on said one side of said base to receive a protrusion or bead on a surface of a mating connector,
    said detent or grove spaced transversely of said base from said protrusion or bead.

2. The edge connector of claim 1 wherein the end of said support wall spaced from said base and the side of said tongue opposite said recess defines an outwardly facing outer surface comprising said protrusion or bead extending from said outer surface away from said recess between said transverse center of said base and said one edge of said base.

3. The edge connector of claim 2 wherein said protrusion or bead is located at the end of said support wall.

4. The edge connector of claim 2 wherein said detent or groove is positioned in said base between said transverse center of said base and said other edge of said base.

5. The edge connector of any one of claims 2, 3 or 4 wherein said detent or groove is located between said free end of said tongue and said other edge of said base at a distance from the center of said tongue equal to the distance of said support wall from the center of said tongue.

6. The edge connector of claim 1 wherein said base further comprises a bracing wall integral with said base and extending from said base between said support wall and said one edge of said base, generally parallel with said support wall.

7. The edge connector of claim 6 wherein said bracing wall has a height above said base equal to the distance between said base and the outer surface of said tongue facing away from said base.

8. The edge connector of claim 7 wherein said bracing wal further comprises a protrusion or bead extending from the end of said bracing wall away from said base beyond the outer surface of said tongue.

9. The edge connector of claim 8 wherein said base further comprises a detent or groove in said base between said free end of said tongue and said other edge of said base at a distance from the center of said base equal to the distance of said bracing wall from the center of said base.

10. The edge connector of claim 1 wherein said tongue, in section, has parallel walls extending parallel to said base, said tongue being spaced from said base a distance sufficient to receive a similarly dimensioned tongue of said mating connector.

11. The edge connector of claim 1 wherein said base further comprises at least one leg integral with and extending away from said base on the other side thereof opposite said support wall.

12. The edge connector of claim 11 wherein said base further comprises at least two said legs integral with and extending away from said base on the other side thereof opposite said support wall.

13. The edge connector of claim 12 wherein said base further comprises a crossbar between two said legs, said crossbar being spaced from said base and creating a groove between said legs, said base and said crossbar.

14. The edge connector of claim 13 wherein said two legs extend away from said base beyond said crossbar.

15. The edge connector of claim 1 wherein said connector comprises an elongated extrusion, said base edges, support wall and tongue extending along the length of said extrusion.

16. The edge connector of claim 15 wherein said support wall further comprises a head extending therealong away from said support wall and beyond said tongue, said tongue extends from said support wall generally parallel to said base a distance beyond said center of said base to said free end no greater than the distance from said center of said base to the adjacent side of said support wall, said tongue being spaced from said base a distance approximately equal to the thickness of said tongue between the walls thereof, and said base comprises an elongated groove parallel to said support wall positioned adjacent and beyond said free end of said tongue and spaced from said center of said base a distance equal to the spacing of said bead from said center, said groove being adapted to receive a bead on the support wall of a mating connector with the tongue of said mating connector positioned between the tongue and base of said edge connector.

17. The edge connector of claim 16 wherein said base further comprises a bracing wall integral with said base, extending from said base between said support wall and said one edge of said base, generally parallel with said support wall.

18. The edge connector of claim 17 wherein said bracing wall further comprises a bead extending from the end of said bracing wall away from said base beyond the outer surface of said tongue, and said base further comprises a second elongated groove parallel to said bracing wall positioned adjacent and beyond said free end of said tongue and spaced from said center of said base a distance equal to the spacing of said bracing wall from said center of said base, said second groove adapted to receive a bead on the bracing wall of a mating connector.

19. The edge connector of claim 18 wherein said base further comprises at least one leg integral with and extending away from said base on the other side thereof opposite said support wall.

20. The edge connector of claim 17 wherein said base further comprises at least one leg integral with and extending away from said base on the other side thereof opposite said support wall.

21. The edge connector of claim 16 wherein said base further comprises at least one leg integral with and extending away from said base on the other side thereof opposite said support wall.

22. The edge connector of claim 19 wherein said base further comprises at least two said legs integral with and extending away from said base on the other side thereof opposite said support wall.

23. The edge connector of claim 22 wherein said be further comprises a crossbar between two said legs, said crossbar being spaced from said base and creating a groove between said legs, said base and said crossbar.

24. The edge connector of claim 23 wherein said two legs extend away from said base beyond said crossbar.

25. The edge connector of any one of claims 11, 19, 20, or 21, in combination with a panel member, said connector attached to one side edge of said panel member, said panel member having at least one groove in its said edge receiving therein said at least one leg of said connector.

26. The panel member and connector assembly of claim 25 wherein said leg is adhesively secured in said groove.

27. The panel member and connector assembly of claim 25 wherein said panel member comprises styrofoam.

28. The panel member and connector assembly of claim 27 wherein said leg is adhesively secured to said styrofoam in said groove.

29. The panel member and connector assembly of claim 25 wherein said base further comprises at least two said legs integral with an extending away from said base on the other side thereof opposite said support wall.

30. The panel member and connector assembly of claim 25 wherein said base further comprises a crossbar between two said legs, said crossbar being spaced from said base and creating a groove between said legs, said base and said crossbar.

31. The panel member and connector assembly of claim 25 wherein said two legs extend away from said base beyond said cross bar.

32. The edge connector of any one of claims 1, 2, 15, 16, or 17 wherein said connector comprises one of a plurality of connectors integrally connected to the edges of the bases thereof, said connectors angularly disposed relative to each other.

* * * * *

UNITED STATES PATENT AND TRADEMARK OFFICE
CERTIFICATE OF CORRECTION

PATENT NO. : 5,313,751

DATED : 5/24/94

INVENTOR(S) : Waldemar E. Wittler

It is certified that error appears in the above-identified patent and that said Letters Patent is hereby corrected as shown below:

In col. 3, line 24, please delete "is set" and insert --isoset--.

In col. 3, line 38, please delete "solvent less" and insert --solventless--.

In col. 3, line 50, please delete "0.125°" and insert --0.125"--.

In col. 4, line 38, please delete "0.25°" and insert --0.25"--.

In col. 4, line 65, please delete "solvent less" and insert --solventless--.

In col. 6, line 25, please delete "n" and insert --in--.

In col. 6, line 26, please delete "sand" and insert --and--.

In col. 6, line 62, please delete "wal" and insert --wall--.

In col. 7, line 27, please delete "head" and insert --bead--.

In col. 8, line 19, please delete "be" and insert --base--.

UNITED STATES PATENT AND TRADEMARK OFFICE
CERTIFICATE OF CORRECTION

PATENT NO. : 5,313,751
DATED : 5/24/94
INVENTOR(S) : Waldemar E. Wittler

It is certified that error appears in the above-identified patent and that said Letters Patent is hereby corrected as shown below:

In col. 8, line 55, please delete "to" and insert --at--.

Signed and Sealed this

Twenty-third Day of December, 1997

Attest:

BRUCE LEHMAN

Attesting Officer

Commissioner of Patents and Trademarks